(12) United States Patent
Chen

(10) Patent No.: US 9,081,913 B2
(45) Date of Patent: Jul. 14, 2015

(54) INTEGRATED CIRCUIT AND CLOCK FREQUENCY CONTROL METHOD OF INTEGRATED CIRCUIT

(75) Inventor: Chi-Ming Chen, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 375 days.

(21) Appl. No.: 13/043,431

(22) Filed: Mar. 8, 2011

(65) Prior Publication Data

US 2011/0239033 A1  Sep. 29, 2011

(30) Foreign Application Priority Data

Mar. 26, 2010 (TW) ................. 99109145 A

(51) Int. Cl.
 *G06F 1/32* (2006.01)
 *G06F 13/42* (2006.01)
(52) U.S. Cl.
 CPC .................. *G06F 13/4291* (2013.01)
(58) Field of Classification Search
 None
 See application file for complete search history.

(56) References Cited

U.S. PATENT DOCUMENTS

| | | | |
|---|---|---|---|
| 6,504,854 B1 | 1/2003 | Hofmann et al. | |
| 6,622,194 B1 | 9/2003 | Lee | |
| 7,606,952 B2 | 10/2009 | Chen | |
| 2001/0005871 A1 | 6/2001 | Shimoda et al. | |
| 2004/0153582 A1* | 8/2004 | Oyama et al. | 710/15 |
| 2004/0187045 A1* | 9/2004 | Butcher | 713/500 |
| 2006/0206644 A1* | 9/2006 | Tsai et al. | 710/105 |
| 2008/0231328 A1* | 9/2008 | Leydier et al. | 327/105 |
| 2008/0297202 A1* | 12/2008 | Takita et al. | 327/42 |

FOREIGN PATENT DOCUMENTS

| | | |
|---|---|---|
| CN | 1940808 A | 4/2007 |
| CN | 1955949 A | 5/2007 |
| JP | 2006-304011 | 11/2006 |
| TW | 200426557 A | 12/2004 |
| TW | 200907693 A | 2/2009 |

* cited by examiner

*Primary Examiner* — Paul Yanchus, III
(74) *Attorney, Agent, or Firm* — CKC & Partners Co., Ltd.

(57) ABSTRACT

A bus interface includes a chip select terminal, a first transmission bus terminal, a second transmission bus terminal, and a clock control device. The chip select terminal transmits a chip select signal to start the data transmission. When the data transmission starts, the first transmission bus terminal sends data to the second device, and the second transmission bus terminal sends the data from the second device to the first device. The clock control device includes a frequency processing unit and a transmission clock generating unit. The frequency processing unit outputs a clock control signal when a frequency to set value changes. The transmission clock generating unit receives the clock control signal and generates a transmission clock in accordance with the frequency setting value.

16 Claims, 7 Drawing Sheets

INTEGRATED CIRCUIT AND CLOCK FREQUENCY CONTROL METHOD OF INTEGRATED CIRCUIT

RELATED REFERENCE

This application claims priority to Taiwan Application Serial Number 099109145, filed Mar. 26, 2010, which is herein incorporated by reference.

BACKGROUND

1. Field of Invention

The disclosure relates to a timing control device generating a clock required by a serial type bus.

2. Description of Related Art

The Serial Peripheral Interface (SPI) is an interconnection interface with a slave-master structure and is extensively used between the electronic devices. In conventional Serial Peripheral Interfaces, the frequency of the serial transmission clock is unique and fixed. In other words, the transmission frequency as well as the transmission rate of the conventional Serial Peripheral Interface is kept the same no matter what is delivered, whether the data or the command. However, the serial transmission clock with a unique frequency can't meet the requirement of the modern electronic system.

Therefore, there is a need for a new timing control device that can immediately adjust the frequency of the transmission clock according to the requirement of the individual electronic system.

SUMMARY

According to one embodiment of the present invention, a bus interface electrically connected to a first device is disclosed, in which the bus interface includes a chip select terminal, a first transmission bus terminal, a second transmission bus terminal, and a clock control device. The chip select terminal transmits a chip select signal to start the data transmission. When the data transmission starts, the first transmission bus terminal sends data to the second device, and the second transmission bus terminal sends the data from the second device to the first device. The clock control device includes a frequency processing unit and a transmission clock generating unit. The frequency processing unit outputs a clock control signal when a frequency set value changes. The transmission clock generating unit receives the clock control signal and generates a transmission clock in accordance with the frequency setting value.

According to another embodiment of the present invention, a bus interface electrically connected to a first device is disclosed, in which the bus interface includes a chip select terminal, a first transmission bus terminal, a second transmission bus terminal, and a clock control device. The chip select terminal transmits a chip select signal to start the data transmission. When the data transmission starts, the first transmission bus terminal sends data to the second device, and the second transmission bus terminal sends the data from the second device to the first device. The clock control device includes a frequency processing unit and a transmission clock generating unit. The frequency processing unit generates a frequency control bit which adjusts the frequency of a transmission clock. The transmission clock generating unit receives the frequency control bit and generates a transmission clock in accordance with the frequency control bit.

According to still another embodiment of the present invention, a frequency control method for adjusting a frequency of a transmission clock employed by a bus interface is disclosed. The method determines whether a bus has started to transmit at least one command or data and detects whether a frequency setting value is changed when the bus starts to transmit the command or the data. The method also detects whether the transmission of a packet group is finished when the frequency setting value has been changed, and the method loads the changed frequency setting value and adjusts the frequency of the transmission clock according to the loaded frequency setting value. After that, the method outputs the transmission clock with an adjusted frequency.

According to another embodiment of the present invention, a frequency control method for adjusting a frequency of a transmission clock employed by a bus interface during the packet group transmission is disclosed. The method determines whether a bus has started to transmit at least one command or data and detects whether a variable output timing signal is asserted when the bus starts to transmit the command or the data. The method also selects one from a plurality of frequency setting values according to a frequency control bit and adjusts the frequency of the transmission clock according to the selected frequency setting value.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
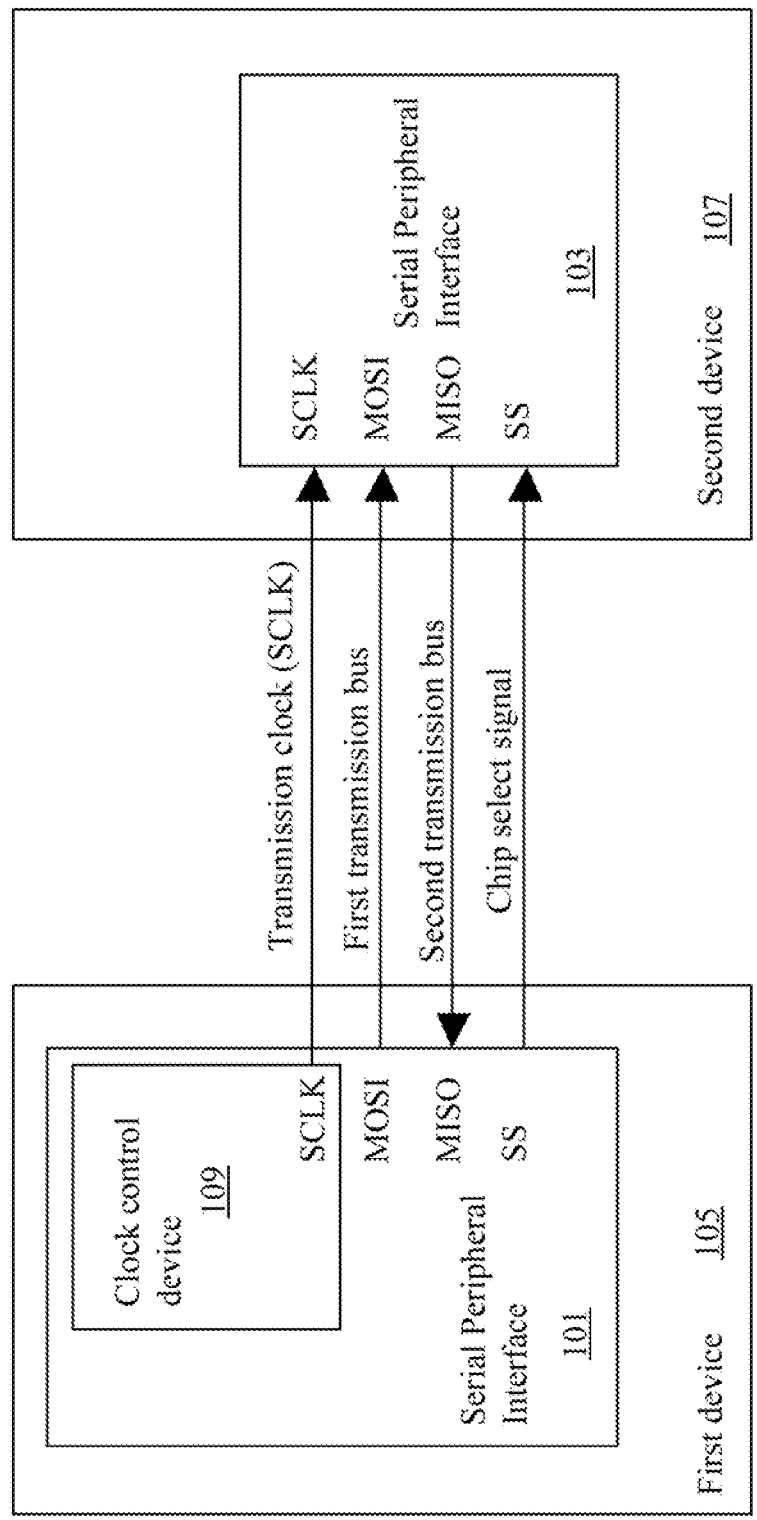
FIG. 1 is the block diagram of the bus system according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The bus interface and the clock frequency control method thereof in the following embodiments can immediately adjust the frequency of the serial type transmission clock as required, such that the electronic device of the Serial Peripheral Interface (SPI) can immediately respond to data variations or collect more data during transmission period.

FIG. 1 is the block diagram of the bus system according to one embodiment of the present invention. The bus interface, such as the serial peripheral interface 101, is electrically connected to the first device 105, and the serial peripheral interface 103 is electrically connected to the second device 107. The first device 105 can be the SPI master device, and the second device 107 can be the SPI slave device. The serial peripheral interface 101 includes a chip select terminal SS (Slave Select), a first transmission bus terminal such as the Master Output Slave Input (MOSI), a second transmission bus terminal such as the Master Input Slave Output (MISO), and a clock control device 109.

The chip select terminal SS is utilized to transmit a chip select signal in order to start the data transmission. When the data transmission starts, the MOSI sends data in the certain type such as the serial type to the second device 107, and the MISO sends the data in the certain type such as the serial type from the second device 107 to the first device 105. The clock control device 109 generates the clock for controlling the data transmission rate.

Figure 2A:
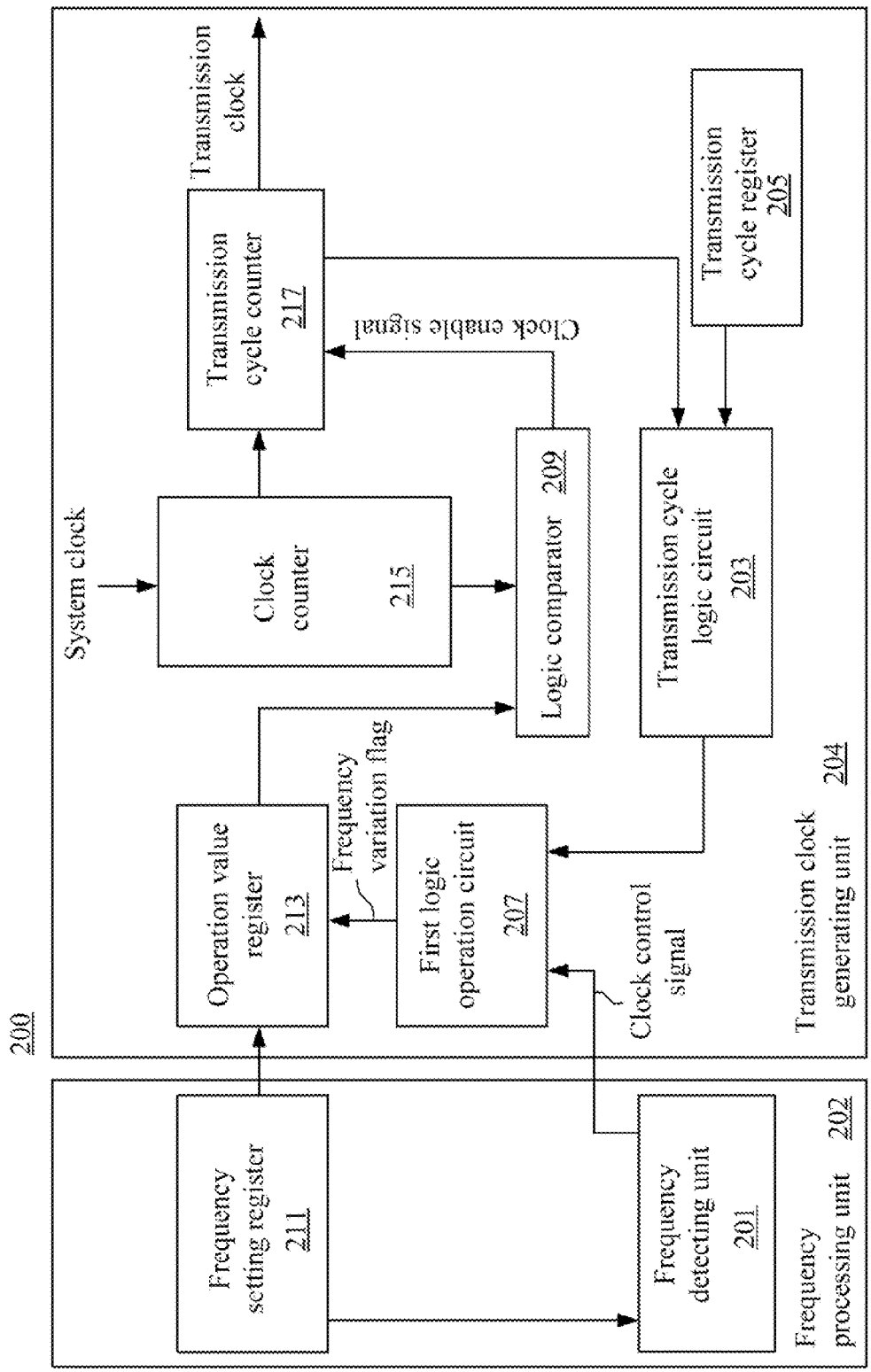
FIG. 2A is the block diagram of the clock control device in the bus interface according to one embodiment of the present invention.

FIG. 2A is the block diagram of the clock control device in the bus interface according to one embodiment of the present invention. The clock control device 200 generates the transmission clock with a variable frequency and can be disposed in the serial peripheral interface to control the data transmission as well as the command transmission. The clock control device 200 includes a frequency processing unit 202 and a transmission clock generating unit 204. When frequency setting value changes, the frequency processing unit 202 outputs a clock control signal. The transmission clock generating unit 204 receives the clock control signal and generates a transmission clock in accordance with the frequency setting value.

The frequency processing unit 202 includes a frequency setting register 211 and a frequency detecting unit 201. The frequency setting register 211 receives and stores the frequency setting value; the frequency setting register 211 also provides the frequency setting value to the frequency detecting unit 201. The frequency detecting unit 201 electrically connected to the frequency setting register 211 detects the variation of the frequency setting value. When the frequency detecting unit 201 detects that the frequency setting value has been changed, the frequency variation flag is asserted to either logic 1 or logic 0. Then, the frequency setting value can be outputted from the frequency setting register 211 to the operation value register 213.

In the embodiment shown in FIG. 2A, the transmission clock generating unit 204 includes a clock counter 215, a logic comparator 209, a transmission cycle counter 217, a first logic operation circuit 207, and an operation value register 213.

The clock counter 215 counts the cycle number of a system clock having frequency greater than the frequency of the transmission clock. The higher frequency of the system clock facilitates the clock counter 215 to count the number based on the system clock. The logic comparator 209 receives and compares the frequency setting value with the accumulated cycle number of the system clock. When the cycle number of the system clock is equal to the frequency setting value, the logic comparator 209 asserts a clock enable signal to make the transmission cycle counter 217 output the transmission clock. The following description illustrates the situation when the frequency setting value is equal to the accumulated cycle number of the system clock. If the frequency setting value is 0x15F (hexadecimals), the transmission cycle counter 217 will output the transmission clock and reset the clock counter 215 to recount when the clock counter 215 counts to 0x15f either from 0 or from 0xFFF. The greater the difference between the frequency setting value and the maximum (or minimum) value, the longer the clock counter 215 counts, which produces a low frequency transmission clock.

The frequency setting value is a divisor if the clock counter 215 counts up from 0. For example, if the system clock and the required transmission clock are 24 MHZ as well as 2 MHZ respectively, the contents of the frequency setting register 211 is set to 12. In this situation, the clock counter 215 will outputs a transmission clock if it has counted 12 system clock cycles.

In this embodiment, the transmission cycle logic circuit 203 detects whether the transmission of the packet group is finished, and the frequency of the transmission clock is adjusted only after the data packet or the command packet had been completely transmitted. That is, the frequency of the transmission clock is not adjusted during the transmission of the same one packet group. The first logic operation circuit 207 asserts a frequency variation flag to notify that the frequency of the transmission clock needs to be changed when the frequency setting value is changed and the transmission of the packet group is finished; and the first logic operation circuit 207 de-asserts the frequency variation flag after the frequency of the transmission clock is adjusted. The operation value register 213 loads the frequency setting value from the frequency setting register 211 if the frequency variation flag is asserted and outputs the frequency setting value to the logic comparator 209. In another embodiment, the frequency setting register 211 can directly outputs the frequency setting value to the logic comparator 209.

The clock control device 200 can further includes the transmission cycle register 205 to store the designed cycle number of the transmission clock. The transmission cycle logic circuit 203 compares the designated cycle number for generation with the generated cycle number and identifies that the transmission of the packet group is finished when the generated cycle number is equal to the designated cycle number for generation. The clock control device 200 can adjust the frequency of the transmission clock after the transmission of the is packet group is finished.

Figure 2B:
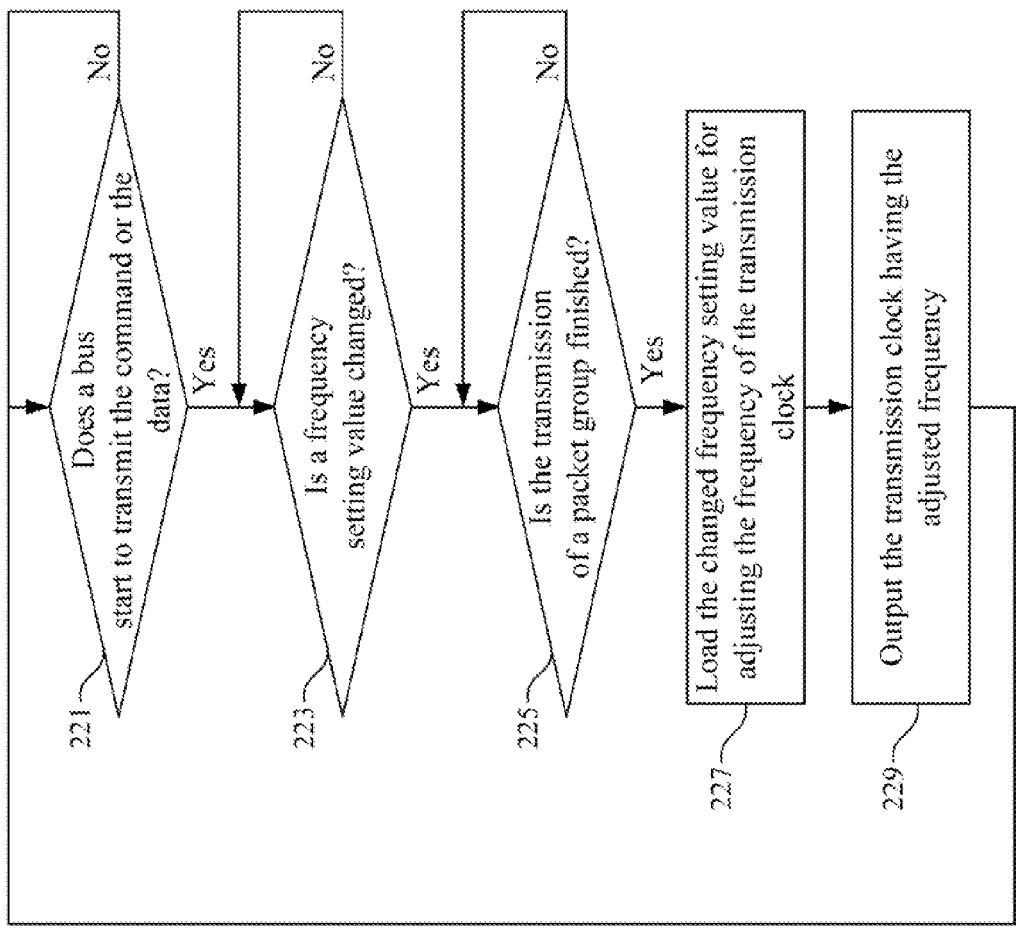
FIG. 2B is the flowchart of the clock frequency control method for the bus interface according to one embodiment of the present invention.

FIG. 2B is the flowchart of the clock frequency control method for the bus interface according to one embodiment of the present invention. The clock frequency control method which adjusts the frequency of a transmission clock employed by a bus interface first determines whether a bus has started to transmit at least one command or at least one data (step 221). The method continues to detect whether a frequency setting value is changed (step 223) if the bus has started to transmit the command or the data; otherwise, the method stays in step 221 to detect whether the bus has been started. The method continues to detect whether the transmission of a packet group is finished if the detected frequency setting value has been changed; otherwise, the clock frequency control stays in step 223 to detect the frequency setting value, and transmission clock frequency used for data transmission is unchanged. When the transmission of a packet group is finished, the method loads the frequency setting value which has been changed and adjusts the frequency of the transmission clock according to the loaded frequency setting value (step 227), then the method outputs the adjusted transmission clock (step 229); otherwise, the method keeps detecting the packet group when the transmission of a packet group is not finished.

Figure 2C:
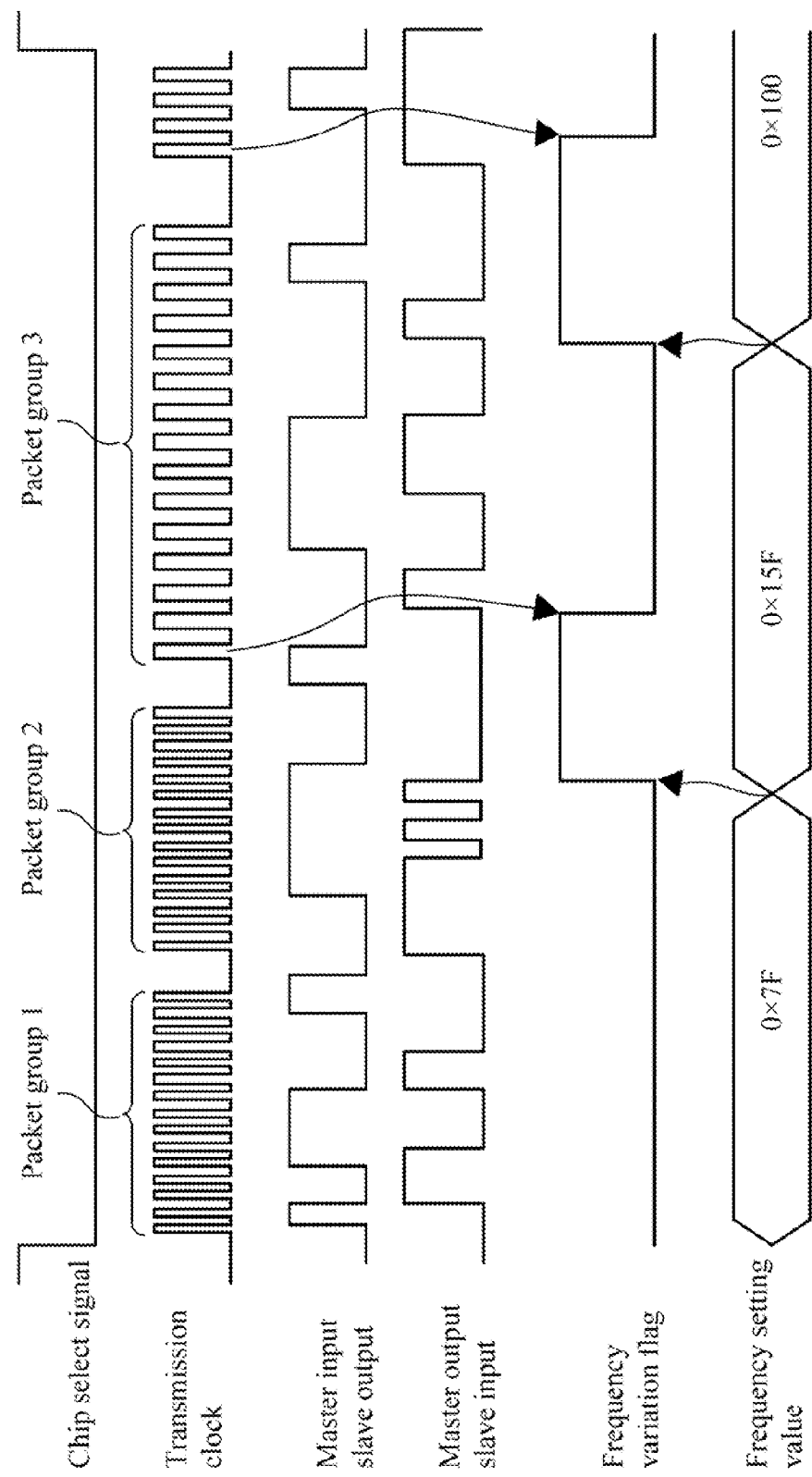
FIG. 2C shows the waveforms of the clock control device in the bus interface according to one embodiment of the present invention; is

FIG. 2C shows the waveforms of the clock control device in the bus interface according to one embodiment of the present invention. In FIG. 2C, the chip select terminal, the transmission clock, and the Master Output Slave Input signals are delivered from the master device to the slave device, while the Master Input Slave Output signal are delivered from slave device to master device. The Master Output Slave Input signals as well as the Master Input is Slave Output signal carry the command and the data, and the transmission clock controls the transmission rate of the command or the data. The packet group 1, the packet group 2, and the packet group 3 are shown in FIG. 2C, and the frequency of the transmission clock is adjusted between different packet groups.

As shown in FIG. 2C, the frequency variation flag is first asserted when the frequency setting frequency is changed from 0x7F to 0x15F, then the frequency of the transmission clock is adjusted accordingly. When the clock control device detects that the frequency of the transmission clock has been adjusted in according with the new frequency setting value, it de-asserts the frequency variation flag which will be asserted again next time.

Because the command packet group, such as the configuration command packet group (e.g. packet group 1 or 2 in FIG. 2C can be considered as command packet group), can be transmitted rapidly, the frequency of the corresponding transmission clock can be increased. The slower data packet group (e.g. packet group 3 in FIG. 2C can be considered as data packet group), which is generated by the slow device such as the analog to digital converter, is transmitted after the command packet group. Therefore, the frequency of the transmission clock corresponding to the data packet group can be reduced.

Figure 3A:
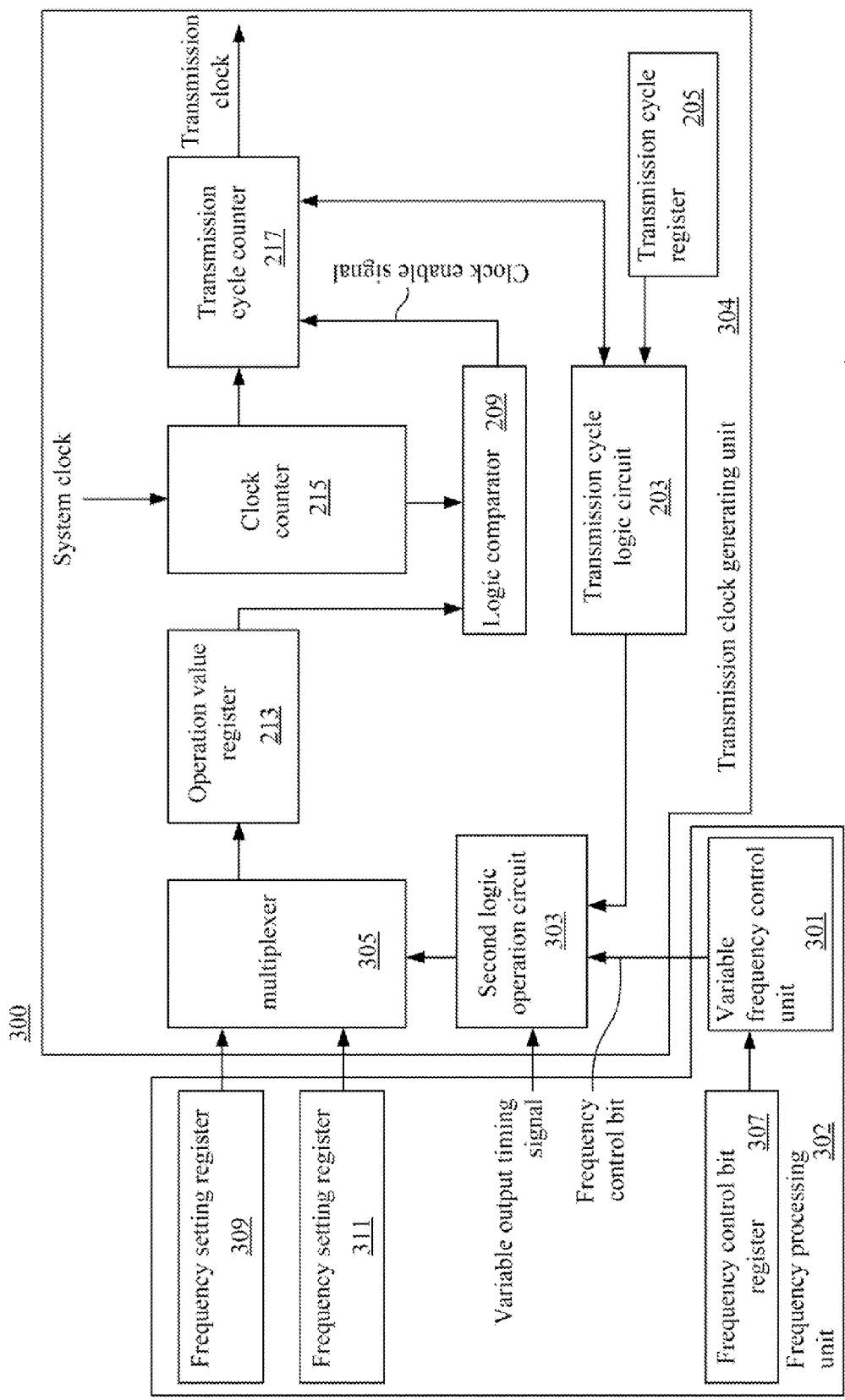
FIG. 3A is the block diagram of the clock control device in the bus interface according to another embodiment of the present invention.

FIG. 3A is the block diagram of the clock control device in the bus interface according to another embodiment of the present invention. The clock control device 300 of this embodiment can adjusts the frequency of the transmission clock during the transmission of the same one packet group. In more detail, the frequency of the transmission clock can be adjusted even if the transmission of the same one packet group has not been finished.

The clock control device 300 includes a frequency processing unit 302 and a transmission clock generating unit 304. The frequency processing unit 302 generates a frequency control bit which adjusts the frequency of the transmission clock, and the transmission clock generating unit 304 receives the frequency control bit and generates a transmission clock in accordance with the frequency control bit.

The frequency processing unit 302 includes a frequency control bit register 307, a variable frequency control unit 301, a frequency setting register 309, and a frequency setting register 311. The frequency control bit register 307 stores the frequency control bit that is inputted therein through an external controller (not shown) by the user. The frequency control bit can be further loaded into the variable frequency control unit 301 having a shift counting index (not shown) which sequentially outputs the received frequency control bit to the second logic operation circuit 303 of the transmission clock generating unit 304. The variable frequency control unit 301 can sequentially output the stored value 32'b00000000011111111111111110000111 (FIG. 3C) to the second logic operation circuit 303 according to the shift counting index.

In FIG. 3A, the frequency setting register 309 as well as the frequency setting register 311 receive and store several frequency setting values which are different from each other, such as hexadecimals 0x80 and 0x15F. Then, the multiplexer 305 of the transmission clock generating unit 304 selects and passes the frequency setting value to the operation value register 213 to adjust the frequency of the transmission clock.

The transmission clock generating unit 304 includes a multiplexer 305, a second logic operation circuit 303, the operation value register 213, the clock counter 215, the logic comparator 209, and the transmission cycle counter 217, in which the operation of the operation value register 213, the clock counter 215, the logic comparator 209, and the transmission cycle counter 217 has been disclosed in the embodiment shown in FIG. 2A.

When the user asserts the variable output timing signal (logic 1), the second logic operation circuit 303 provides the frequency control bit to the multiplexer 305, and the multiplexer 305 selects one of the frequency setting values which the frequency of the transmission clock is based on according to the value of the frequency control bit.

The clock counter 215 counts the cycle number of the system clock, and the logic comparator 209 receives and compares the frequency setting value selected by the multiplexer 305 with the cycle number of the system clock. When the accumulated cycle number of the system clock is equal to the selected frequency setting value, the logic comparator 209 asserts a clock enable signal which enables the transmission cycle counter 217 to output the transmission clock.

The transmission clock generating unit 304 further includes a transmission cycle logic circuit 203 and a transmission cycle register 205. The transmission cycle register 205 stores the designated cycle number of the transmission clock for generation. The transmission cycle logic circuit 203 compares the designated cycle number for generation with the generated cycle number to determine whether the transmission of a packet group is finished, in which the transmission of a packet group is finished when the generated cycle number is equal to the designated cycle number, and the frequency of the transmission clock can also be adjusted in this period a packet group is is finished.

Figure 3B:
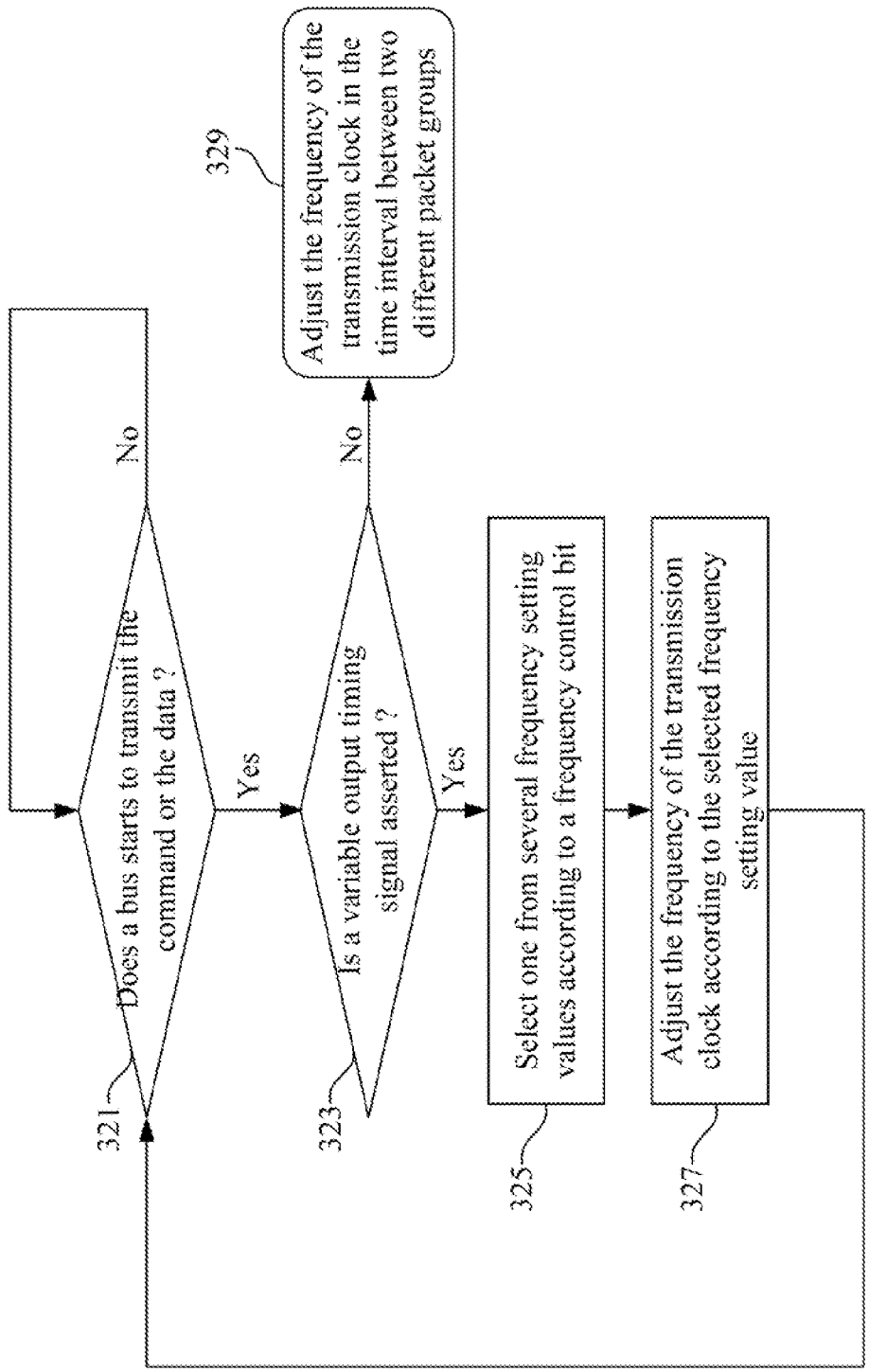
FIG. 3B is the flowchart of the clock frequency control method for the bus interface according to another embodiment of the present invention.

FIG. 3B is the flowchart of the clock frequency control method for the bus interface according to another embodiment of the present invention, in which the method can adjust the frequency of the transmission clock employed by a bus interface during the transmission of the same packet group. The method first detects whether a bus has started to transmit at least one command or at least one data (step 321) and detects whether a variable output timing signal is asserted when the bus starts to transmit the command or the data (step 323). If the bus is idle, the method stays in step 321 to keep detecting the bus. If the method finds out that the variable output timing signal is asserted in step 323, the method selects one from several frequency setting values according to the frequency control bit (step 325) and adjusts the frequency of the transmission clock corresponding to the selected setting value; otherwise, the method can only adjust the frequency of the transmission clock in the time interval between two different packet groups (step 329).

Figure 3C:
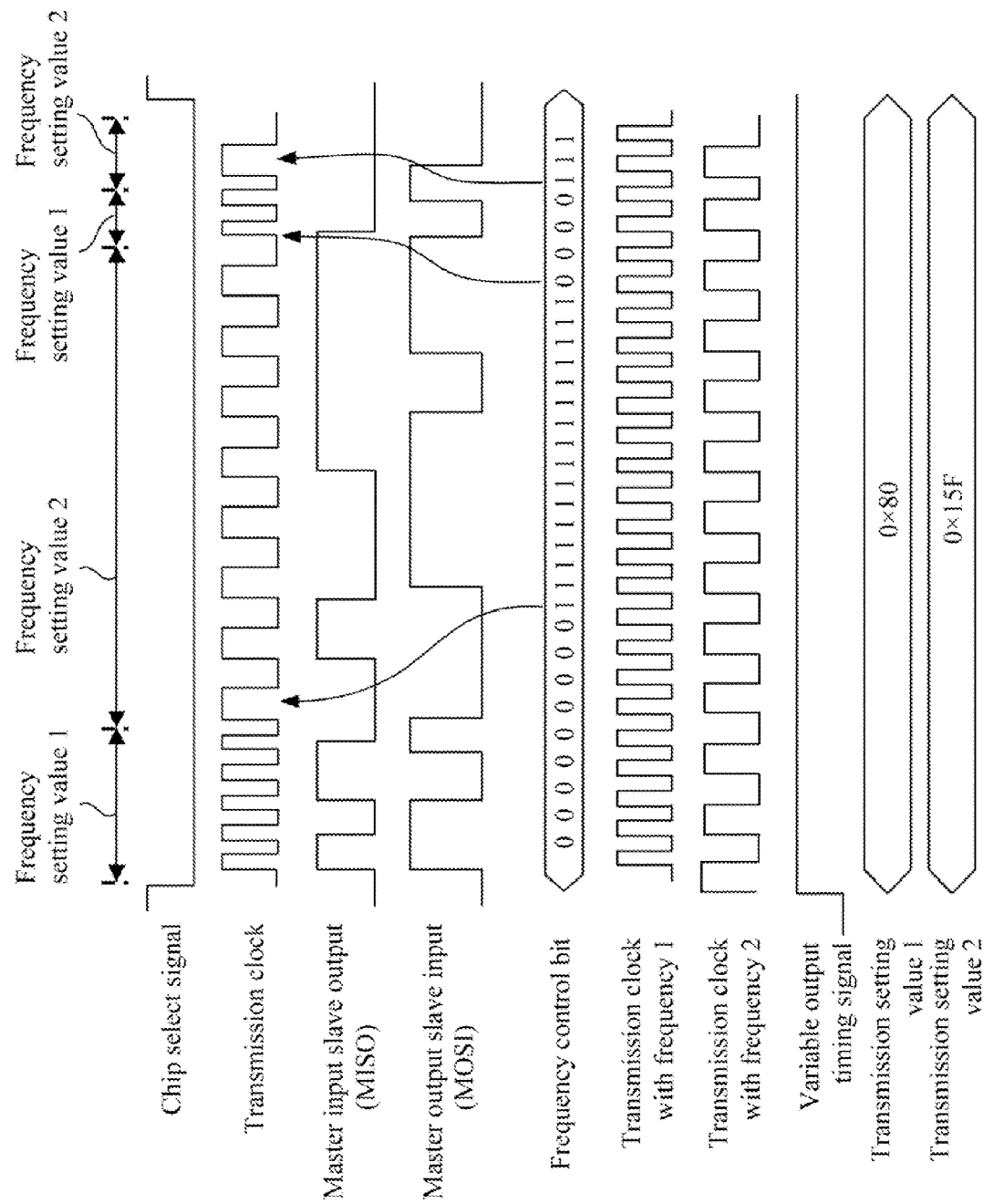
FIG. 3C shows the waveforms of the clock control device in the bus interface according to another embodiment of the present invention.

FIG. 3C shows the waveform of the clock control device in the bus interface according to another embodiment of the present invention. In FIG. 3C, the chip select terminal, the transmission clock, and the MOSI signals are delivered from the master to the slave, while the MISO signal are delivered from slave to master. The MOSI signals and the MISO signal carry the command and the data.

The asserted variable output timing signal represents that the frequency of the transmission clock needs to be adjusted during the transmission of the same packet group. When choosing the frequency of the transmission clock, the frequency setting value 1 (0x80) stored in the first frequency setting register is selected if the frequency control bit is logic 0, while the frequency setting value 2 (0x15F) stored in the second frequency setting register is selected if the frequency control bit is logic 1.

For the same one packet group, the front 5 bits are the register setting commands transmitted in 2 MHZ (transmitting time is 0.5 us), while the later bits are the data transmitted in 400 K (transmitting time is 2.5 us). If the frequency of the transmission clock were fixed at 400 KHZ, it would require 40 us (16×2.5 us) to transmit 16 bits. Advantageously, the embodiment of the present invention requires merely 30 us (5×0.5 us+11×2.5 us) to transmit 16 bits, which reduces transmission time by 25%.

The bus interface and the clock frequency control method thereof in above embodiments can adjust the frequency of the transmission clock between two different packet groups; it can also adjust the frequency of the transmission clock during the transmission of the same one packet group. As a result, the frequency of the serial transmission clock can be immediately adjusted as required by the electronic system. Therefore, the electronic device of the Serial Peripheral Interface (SPI) can immediately respond to the data variation or collect more data, which reduces the time for transmitting the command as well as the data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An integrated circuit electrically connected to a first device, wherein the integrated circuit comprises:
    a chip select terminal for transmitting a chip select signal to start data transmission;
    a first transmission bus terminal for sending data to a second device when the data transmission starts;
    a second transmission bus terminal for sending the data from the second device to the first device when the data transmission starts; and
    a clock control device, comprising:
        a frequency processing unit for outputting a clock control signal when a frequency setting value changes; and
        a transmission clock generating unit comprising a clock counter, wherein the transmission clock generating unit receives the clock control signal and counts a cycle number of a system clock through the clock counter and the frequency setting value to generate a transmission clock with a frequency variable in accordance with the frequency setting value, wherein the transmission clock generating unit comprises:
            a logic comparator for receiving and comparing the frequency setting value with the cycle number of the system clock, wherein the logic comparator asserts a clock enable signal when the cycle number of the system clock is equal to the frequency setting value;
            a transmission cycle counter for outputting the transmission clock when the clock enable signal is asserted;
            a transmission cycle logic circuit for detecting whether the transmission of a packet group is finished;
            a first logic operation circuit for asserting a frequency variation flag when the clock control signal is asserted and the packet group had been delivered; and
            an operation value register for loading the frequency setting value from the frequency setting register and outputting the frequency setting value to the logic comparator, wherein the operation value register loads the frequency setting value from the frequency setting register when the frequency variation flag is asserted.

2. The integrated circuit as claimed in claim 1, wherein the first transmission bus terminal and the second transmission bus terminal are serial peripheral interfaces bus terminal.

3. The integrated circuit as claimed in claim 1, wherein the frequency processing unit comprises:
    a frequency setting register for receiving and storing the frequency setting value; and
    a frequency detecting unit, electrically connected to the frequency setting register, for detecting the variation of the frequency setting value.

4. The integrated circuit as claimed in claim 1, wherein the transmission clock generating unit further comprises a transmission cycle register for storing the designate cycle number of the transmission clock for generation.

5. The integrated circuit as claimed in claim 1, wherein the transmission cycle logic circuit compares the designated cycle number for generation with the generated cycle number and determines that the transmission of the packet group is finished when the generated cycle number is equal to the designated cycle number for generation.

6. The integrated circuit as claimed in claim 1, wherein the first logic operation circuit de-asserts the frequency variation flag when the frequency of the transmission clock had been changed.

7. The integrated circuit as claimed in claim 1, wherein the frequency of the transmission clock is less than the frequency of the system clock.

8. The integrated circuit as claimed in claim 1, wherein the frequency of the transmission clock is adjusted when transmission of packet group is completed.

9. An integrated circuit electrically connected to a first device, wherein the integrated circuit comprises:
    a chip select terminal for transmitting a chip select signal to start data transmission;
    a first transmission bus terminal for sending data to a second device when the data transmission starts;
    a second transmission bus terminal for sending the data from the second device to the first device when the data transmission starts; and
    a clock control device, comprising:
        a frequency processing unit for generating a frequency control bit which adjusts the frequency of a transmission clock; and
        a transmission clock generating unit for receiving the frequency control bit and generating a transmission clock in accordance with the frequency control bit, wherein the transmission clock generating unit comprises:
            a multiplexer for selecting one of the frequency setting values according to the value of the frequency control bit;
            an register for storing the frequency setting value selected by the multiplexer and outputting the frequency setting value to a logic comparator; and
            a second logic operation circuit for providing the frequency control bit to the multiplexer when a variable output timing signal is asserted.

10. The integrated circuit as claimed in claim 9, wherein the first transmission bus terminal and the second transmission bus terminal deliver data in serial type.

11. The integrated circuit as claimed in claim 9, wherein the frequency of the transmission clock is adjusted when a packet group is transmitting.

12. The integrated circuit as claimed in claim 9, wherein the frequency processing unit comprises:

a frequency control bit register for storing the frequency control bit; and a variable frequency control unit for loading the frequency control bit from the frequency control bit register and for sequentially outputting the frequency control bit to the transmission clock generating unit.

13. The integrated circuit as claimed in claim 12, wherein the frequency processing unit further comprises a plurality of frequency setting registers for storing and providing a plurality of frequency setting values.

14. The integrated circuit as claimed in claim 13, wherein the transmission clock generating unit comprises:

a clock counter for counting a cycle number of a system clock;

a logic comparator for receiving and comparing the frequency setting value selected by the multiplexer and the cycle number of the system clock, wherein the logic comparator asserts a clock enable signal when the cycle number of the system clock is equal to the selected frequency setting value; and a transmission cycle counter for outputting the transmission clock when the clock enable signal is asserted.

15. The integrated circuit as claimed in claim 14, wherein the transmission clock generating unit further comprises a transmission cycle logic circuit for comparing a designated cycle number for generation with the generated cycle number of the transmission clock, and the packet group is finished when the generated cycle number is equal to the designated cycle number.

16. The integrated circuit as claimed in claim 15, wherein the transmission clock generating unit further comprises a transmission cycle register for storing the designated cycle number of the transmission clock for generation.

\* \* \* \* \*